J. G. CHARLIER.
EDUCATIONAL DEVICE.
APPLICATION FILED DEC. 27, 1911.
1,052,460.
Patented Feb. 11, 1913.
2 SHEETS—SHEET 2.
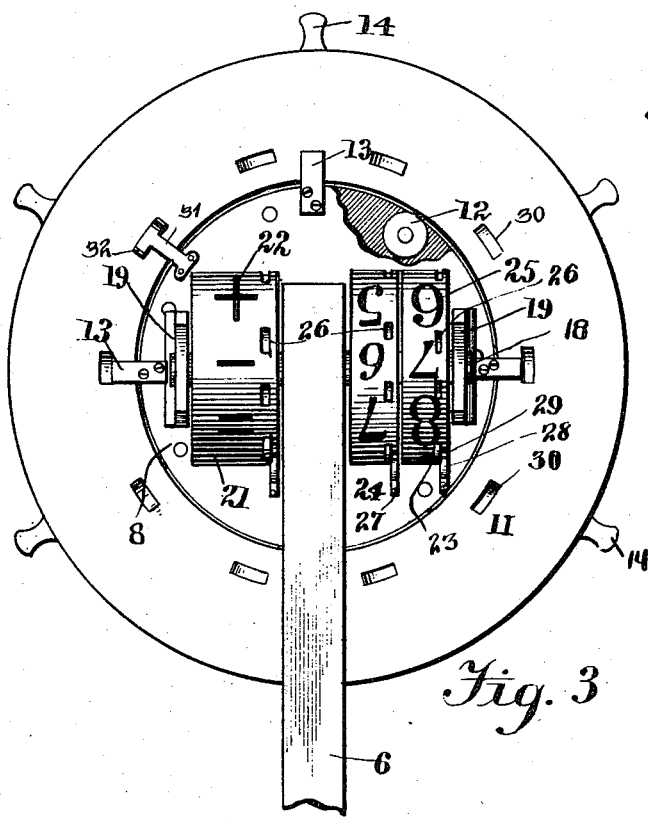
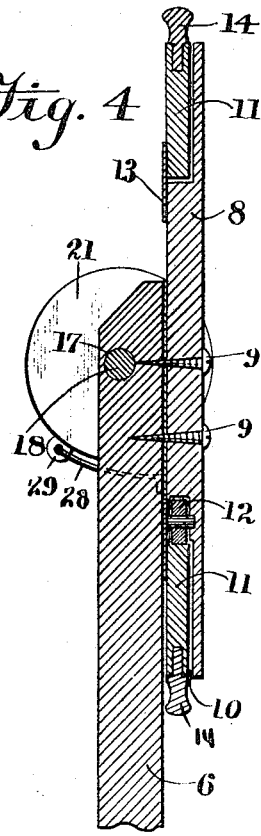
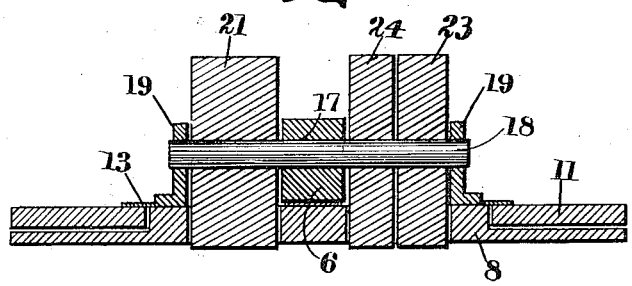
Inventor
J. G. Charlier
Witnesses
Alfred G. Seiler
George Tate
By
Attorneys

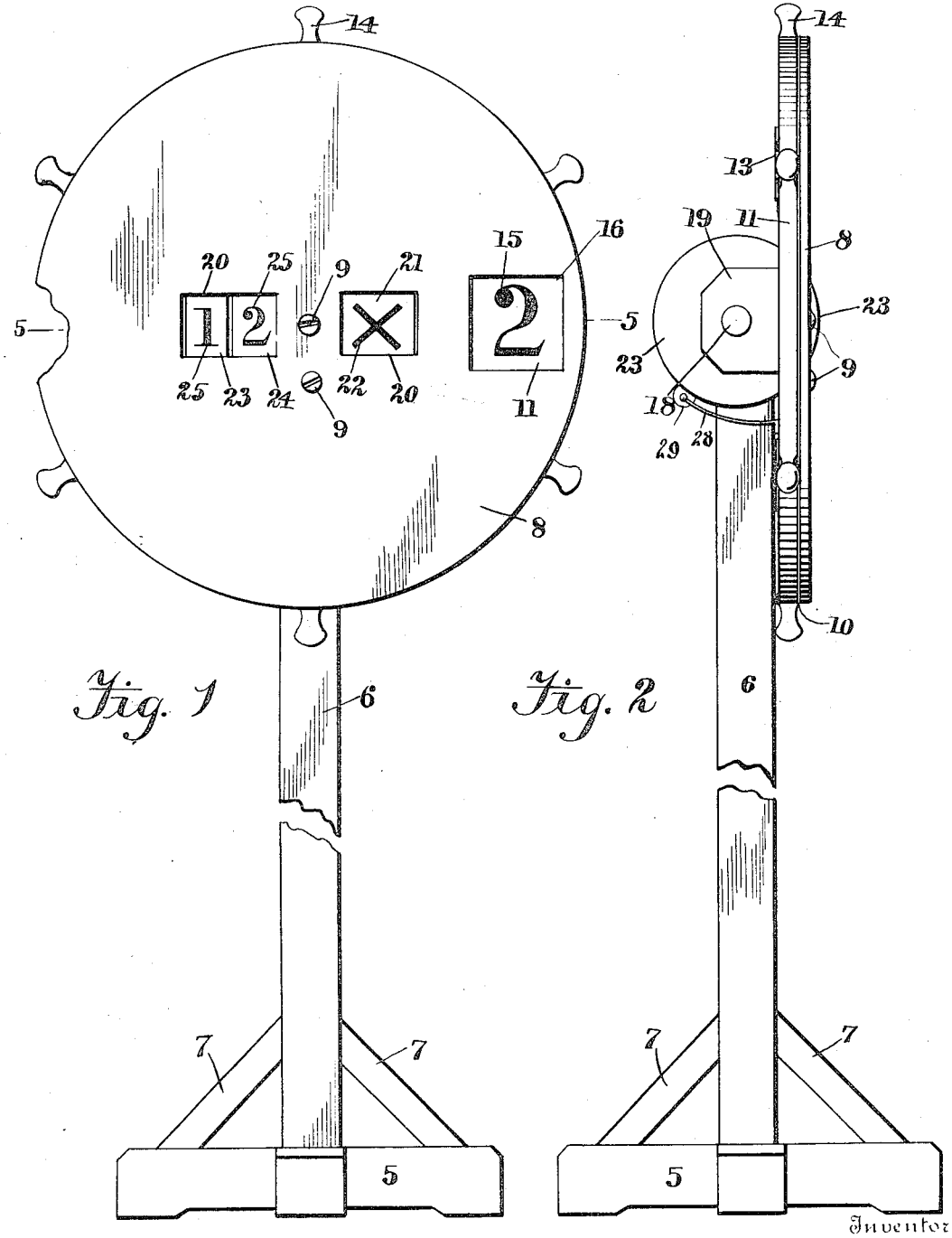

UNITED STATES PATENT OFFICE.

JOSEPH G. CHARLIER, OF EVERETT, WASHINGTON.

EDUCATIONAL DEVICE.

1,052,460.  Specification of Letters Patent.  Patented Feb. 11, 1913.

Application filed December 27, 1911. Serial No. 668,105.

*To all whom it may concern:*

Be it known that I, JOSEPH G. CHARLIER, a citizen of the United States, residing at Everett, in the county of Snohomish, State of Washington, have invented certain new and useful Improvements in Educational Devices; and I do hereby declare the following to be a full, clear, and exact description of the invention, such as will enable others skilled in the art to which it appertains to make and use the same.

This invention relates to an improvement in educational devices of that type adapted to teach children the fundamental principles of arithmetic.

The principal object of the invention is to provide a device for the purpose described in which there is provided a perforated disk on which is rotatably mounted a ring carrying a plurality of numbers which are adapted to be visible through the perforation in succession, the numbers being arranged in progression.

Another object of the invention is to provide a device of the character described, in which there is provided a plurality of rollers each having a series of number or other character designations formed thereon and adapted to be successively visible through certain perforations in the said disk.

A further object of the invention is to provide an educational device for the purpose set forth, which is composed of a minimum number of parts, is therefore simple in construction and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims may be resorted to without departing from the spirit or sacrificing any of the advantages of the invention.

In the drawings: Figure 1 is a front elevation of an educational device constructed in accordance with my invention, Fig. 2 is a side elevation thereof, Fig. 3 is a rear elevation of the structure shown in Fig. 1, a portion of the disk being shown in section to show the anti-friction rollers for the ring, Fig. 4 is a vertical sectional view through the device, and Fig. 5 is a horizontal sectional view taken on the line 5—5 of Fig. 1.

Like reference numerals designate corresponding parts in all the figures of the drawings.

Referring to the drawings, the device includes a base 5 to which is centrally connected an angular standard 6, said base and standard being held rigidly by means of braces 7. Secured to the upper end of the standard and directly against one face thereof, is a disk 8 of wood or other suitable material. This disk is secured to the standard by screws 9 or other suitable fastening means. Formed in the inner face of the disk is a marginal recess 10 in which is rotatably mounted a flat ring 11 also of wood or other suitable material, said ring being supported upon friction rollers 12 carried by the disk 8. This ring is held in its recess by means of clips 13 carried by the inner face of the disk 8. Radially projecting from the periphery of the ring 11, is a plurality of hand pieces 14 by means of which said ring can be easily rotated. Located on the inner face of the ring 11 is a plurality of number designations 15. These numbers are arranged in progression from "0" to "12". It will of course be understood that more or less numbers can be employed if desired, but it is the purpose of employing these numbers to illustrate to children how the units merge with the tens. In order that the pupil may readily observe any one of these numbers, there is formed in the disk 8 near its periphery an opening 16, which is disposed in the path of said designation 15.

Formed in the upper end of the standard 6 is a transverse opening 17, said opening being disposed in a plane parallel to the plane of the disk 8. Mounted within this opening and projecting beyond the opposite sides of the standard is an axle 18, the ends of the axle being supported in bearings 19—19 mounted upon the rear face of the disk 8 and preferably in alinement with the opening 16. Formed in the disk 8 on opposite sides of the standard 6 and in the same plane as the shaft 18 are openings 20—20. Loosely mounted upon the end of the shaft 18 is a roller 21, on the periphery of which is located a plurality of sign designations 22, said designations representing the common signs employed in arithmetic, and known as "plus", "minus", "times", and "division" signs. These designations are visible in succession through the respective opening 20 of the said disk. Loosely mounted upon the other end of the axle 18 and disposed in registry with the other opening 20 of said disk is a pair of rollers 23 and 24 respectively. Formed on the periphery of each roller is a plurality of number designations 25, said designations being arranged in progression and represent the numbers "0" to 9 inclusive.

Formed on the periphery of each of the rollers 21, 23, and 24 is a series of depressions 26, the depressions of each roller being respectively disposed in spaced relation corresponding to the distances between the designations of the respective rollers. Secured to the rear face of the disk 8 preferably below the respective rollers are flat springs 27, the upper ends 28 thereof carrying rollers 29 adapted for engagement within the depressions 26 of said rollers. It will thus be observed that by means of the springs 27 and the rollers 29, the rollers may be held in any set position.

Formed in the rear face of the ring 11 is a series of depressions 30, said depressions being disposed in spaced relation corresponding to the distances between the designations 15 located on the other side thereof. Secured to the rear face of the disk 8 is a flat spring 31 having its free end formed with a curved head 32 adapted to successively engage the depressions 30, and thereby retain said ring in any adjusted position.

From the foregoing, it will be observed that examples of all kinds may be readily displayed by the designations, as for instance, supposing the teacher desired to give the pupils an example in multiplication, such as 12×2, the multiplication is formed by rotating the rollers 23 and 24 until the designations "1" and "2" are visible within the opening 20, as clearly shown in Fig. 1 of the drawings. The roller 21 is rotated until the sign designation "times" is visible through the respective opening 20 and the ring 11 is rotated until the designation "two" is visible through its respective opening 16. As a result, the example will appear, reading from left to right, as "12×2". It will be observed that the roller 21 can be rotated to bring into register within the respective openings 20 any of its sign designations 22, so as to readily change one form of example to another.

What is claimed is:

1. An educational device including in combination, a disk formed with a series of openings, movable elements respectively disposed in rear of certain of said openings, certain of the elements having a series of number designations formed thereon and one of the elements having a series of sign designations formed thereon, and a ring rotatably mounted upon the disk and formed with a plurality of number designations adapted to successively register with the other of the openings of the disk.

2. An educational device including in combination, a disk formed with a series of openings arranged in alinement, movable elements respectively disposed in rear of certain of said openings, certain of said elements having a series of number designations formed thereon and one of the elements having a series of sign designations formed thereon adapted to coöperate with the number designations of the first mentioned elements to indicate an example, a ring rotatably mounted on the disk and formed on its face with a plurality of number designations adapted to successively register with the other of said openings of the disk, said ring having its rear face formed with a series of depressions arranged in spaced relation and corresponding to the distances between the designations formed on said ring, and a flat spring secured to the disk and having its free end arranged to successively engage in the depressions of the ring.

3. An educational device comprising in combination, a standard, a disk carried by the standard and formed with a series of openings, a ring rotatably mounted upon the disk and formed with a plurality of number designations adapted to successively register with one of said openings, a shaft supported by the standard, a plurality of rollers loosely mounted upon the shaft and respectively projecting into the other of said openings of the disk, certain of said rollers being formed with a plurality of numbers adapted to successively register with the respective opening and the other roller being formed with a plurality of sign designations adapted to coöperate with the number designations of the rollers and the ring to indicate an example.

In testimony whereof, I affix my signature, in presence of two witnesses.

JOSEPH G. CHARLIER.

Witnesses:
BENJAMIN W. SHERWOOD,
H. A. CHASE.